No. 757,649. Patented April 19, 1904.

UNITED STATES PATENT OFFICE.

WILLIAM BROTHERS, OF PRESTWICH, ENGLAND.

MANUFACTURE OF PLASTER-OF-PARIS.

SPECIFICATION forming part of Letters Patent No. 757,649, dated April 19, 1904.

Application filed July 13, 1903. Serial No. 165,376. (No specimens.)

*To all whom it may concern:*

Be it known that I, WILLIAM BROTHERS, a British subject, and a resident of Prestwich, in the county of Lancaster, England, have invented certain new and useful Improvements in the Manufacture of Plaster-of-Paris, of which the following is a specification.

This invention relates to the treatment or cooking of calcium sulfate (either the natural gypsum or a chemical by-product or disused plaster molds or other form of calcium sulfate) for the purpose of obtaining plaster-of-paris. Hitherto it has been customary to roast or calcine the gypsum or calcium sulfate to drive off the water of crystallization and convert it into plaster.

I have found that by heating the calcium sulfate (in whatsoever form) in the presence of water or in an aqueous solution to a temperature exceeding boiling-point—212° Fahrenheit or 100° centigrade—that such calcium sulfate will recrystallize as the hydrate $(CaSO_4)_2H_2O$ and may then be separated and dried without again taking up water, provided a considerable temperature is maintained.

My invention consists, essentially, in treating calcium sulfate (either in the natural form of gypsum or in the powdered form of a chemical by-product or other form) in water or in an aqueous solution—such as a solution of potassium sulfate, borax, or alum—at a temperature between 212° and 260° Fahrenheit (or 100° and 130° centigrade) and then separating out and drying the solid product without allowing it to cool below 175° Fahrenheit, (or 80° centigrade.)

When treating natural gypsum, the material is broken up into lumps, or it may be ground to powder, and is mixed with water in a boiler, pan, or vat to which heat can be applied.

When treating a waste or by product which is in a finely-divided state or other sulfate which has been finely ground, it is mixed with water to a thick milky or creamy consistency and is then run into a boiler, pan, or vat to which heat can be applied to raise it to the desired temperature. In one method steam is admitted to or passed through the mixture until it is raised to the required temperature—say about 250° Fahrenheit (or 120° centigrade) at a pressure of about five pounds to twenty pounds per square inch. In another method steam may be applied to a jacket or steam-chamber surrounding the pan at a pressure to raise it to the desired temperature, or the boiler, pan, or vat may be raised to the desired temperature by the direct action of a flame or heated gases from coal, coke, gas, or other fuel.

In the case of natural gypsum being treated when the requisite temperature of about 250° Fahrenheit (or 120° centigrade) is reached the gypsum parts with part of its water of crystallization and recrystallizes as the hydrate of calcium sulfate, $(CaSO_4)_2H_2O$.

In the case of a non-crystalline calcium sulfate when the temperature of about 250° Fahrenheit (or 120° centigrade) is reached it crystallizes into needle-like crystals of the hydrate $(CaSO_4)_2H_2O$.

From the mixture while still hot the water is run or drained off or otherwise removed by a centrifugal machine, filter-press, or other apparatus, and the solid matter or crystals are completely dried at a temperature at or above 175° Fahrenheit (or 80° centigrade) without being permitted to cool below that temperature. The resulting product is a good plaster-of-paris, which may be used in this form or ground to break the crystals and then used in the ordinary way.

What I claim as my invention, and desire to protect by Letters Patent, is—

1. The process of preparing plaster-of-paris from calcium sulfate in any form comprising the cooking or boiling of such calcium sulfate in the presence of water, and separating the crystals so formed, and drying them before cooling, substantially as described.

2. The process of preparing plaster-of-paris from calcium sulfate in any form, comprising cooking or boiling the sulfate in water, at a temperature between 212° and 260° Fahrenheit, removing the water from the solid material, and drying the same before cooling at a temperature not below 175° Fahrenheit, substantially as described.

3. The process of preparing plaster-of-paris from calcium sulfate in any form comprising cooking or boiling the sulfate in an aqueous solution, at a temperature between 212° and 260° Fahrenheit, removing the water from the solid material and drying the same before cooling at a temperature not below 175° Fahrenheit, substantially as described.

4. The process of preparing plaster-of-paris from calcium sulfate in any form comprising cooking or boiling the sulfate in an aqueous solution of potassium sulfate, at a temperature between 212° and 260° Fahrenheit, removing the water from the solid material and drying the same before cooling at a temperature not below 175° Fahrenheit, substantially as described.

In witness whereof I have hereunto signed my name in the presence of two subscribing witnesses.

WILLIAM BROTHERS.

Witnesses:
   I. Owden O'Brien,
   H. Barnfather.